United States Patent
Gold et al.

(10) Patent No.: US 9,279,437 B2
(45) Date of Patent: Mar. 8, 2016

(54) ADJUSTABLE HOLDING DEVICE FOR SENSORS

(71) Applicant: KNORR-BREMSE SYSTEME FÜR NUTZFAHRZEUGE GMBH, München (DE)

(72) Inventors: Matthias Gold, Markgroeningen (DE); Mark Rossi, Freiberg a. N. (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/360,434

(22) PCT Filed: Nov. 20, 2012

(86) PCT No.: PCT/EP2012/073119
§ 371 (c)(1),
(2) Date: May 23, 2014

(87) PCT Pub. No.: WO2013/076084
PCT Pub. Date: May 30, 2013

(65) Prior Publication Data
US 2014/0308063 A1 Oct. 16, 2014

(30) Foreign Application Priority Data

Nov. 24, 2011 (DE) .......................... 10 2011 119 392

(51) Int. Cl.
*F16B 5/02* (2006.01)
*G01S 7/40* (2006.01)
*G01S 13/93* (2006.01)

(52) U.S. Cl.
CPC ............. *F16B 5/0216* (2013.01); *G01S 7/4004* (2013.01); *G01S 13/931* (2013.01); *B60Q 2200/32* (2013.01); *G01S 2013/9325* (2013.01); *Y10T 403/32254* (2015.01)

(58) Field of Classification Search
CPC ............... Y10T 403/32803; Y10T 403/32795; Y10T 403/32786; Y10T 403/32672; Y10T 403/32681; Y10T 403/32704; Y10T 403/32639; Y10T 403/32631; Y10T 403/32254; F16B 5/0216; B60Q 2200/32
See application file for complete search history.

(56) References Cited

U.S. PATENT DOCUMENTS 558,262 A * 4/1896 Darling .......................... 384/209
753,329 A * 3/1904 Tate ............................... 411/374
(Continued)

FOREIGN PATENT DOCUMENTS

| CN | 101198800 | 6/2008 |
|---|---|---|
| DE | 29 16 225 | 11/1979 |

(Continued)

OTHER PUBLICATIONS
International Search Report for PCT/EP2012/071498, issued on May 7, 2013.
(Continued)

*Primary Examiner* — Daniel P Stodola
*Assistant Examiner* — Matthieu Setliff
(74) *Attorney, Agent, or Firm* — Kenyon & Kenyon LLP

(57) ABSTRACT

An adjustable holding device for sensors includes a main body, on and opposite of which, a bearing body supporting a sensor is adjustably held by a spherical joint. The spherical joint includes a threaded stud, fastened to the main body, that protrudes through an opening in the bearing body, and to which an opening in a body having a spherical outer surface is screwed. The outer surface is held pivotably in and co-rotatably with, about an axis coaxial with the threaded stud, complementarily spherical inner surfaces of two combined half-shells. Through rotation under external force of the combined half-shells, the body having the spherical outer surface can be screwed relative to the threaded stud by displacing the half-shells and the bearing body in the threaded stud direction.

22 Claims, 3 Drawing Sheets

(56) References Cited

U.S. PATENT DOCUMENTS

| | | | |
|---|---|---|---|
| 1,551,324 A * | 8/1925 | Offerdahl | 92/191 |
| 1,637,765 A * | 8/1927 | Comstock | 92/157 |
| 3,197,552 A * | 7/1965 | Flair | 174/86 |
| 3,364,778 A * | 1/1968 | Griffen et al. | 74/473.1 |
| 3,749,431 A * | 7/1973 | Schmid et al. | 403/76 |
| 3,813,149 A * | 5/1974 | Lawrence et al. | 297/335 |
| 4,227,826 A * | 10/1980 | Conrad | 403/371 |
| 4,357,651 A * | 11/1982 | Mayer | 362/275 |
| 4,513,857 A * | 4/1985 | Leach | 198/716 |
| 4,923,162 A * | 5/1990 | Fleming et al. | 248/276.1 |
| 5,118,058 A * | 6/1992 | Richter | 248/183.2 |
| 5,251,859 A * | 10/1993 | Cyrell et al. | 248/288.51 |
| 5,261,715 A * | 11/1993 | Blatt et al. | 269/71 |
| 5,642,956 A * | 7/1997 | Hale | 403/122 |
| 5,807,010 A * | 9/1998 | Parker et al. | 403/61 |
| 5,921,698 A * | 7/1999 | Hegen et al. | 403/263 |
| 6,350,060 B1 * | 2/2002 | Peterson | 384/211 |
| 6,364,564 B1 * | 4/2002 | Chaniot et al. | 403/131 |
| 6,382,865 B1 * | 5/2002 | Paxman | 403/131 |
| 6,719,312 B2 * | 4/2004 | Thompson et al. | 280/93.511 |
| 7,534,965 B1 * | 5/2009 | Thompson | 174/153 G |
| 7,603,820 B1 * | 10/2009 | Lai | 52/235 |
| 8,061,753 B2 * | 11/2011 | Papanikolaou et al. | 296/51 |
| 8,266,811 B2 * | 9/2012 | Rivest | 33/608 |
| 2002/0085385 A1 | 7/2002 | Shirai | |
| 2003/0117810 A1 | 6/2003 | Nakazawa et al. | |
| 2004/0013495 A1 * | 1/2004 | Hassed | 411/537 |
| 2008/0219756 A1 * | 9/2008 | Grant | 403/122 |
| 2010/0252978 A1 * | 10/2010 | Philippe | 269/296 |
| 2011/0170945 A1 * | 7/2011 | Gagnon et al. | 403/122 |
| 2012/0119973 A1 * | 5/2012 | Ahring et al. | 343/882 |

FOREIGN PATENT DOCUMENTS

| | | |
|---|---|---|
| DE | 103 54 985 | 6/2004 |
| DE | 10 2006 045317 | 5/2007 |
| EP | 1 120 310 | 8/2001 |
| EP | 2 233 364 | 9/2010 |

OTHER PUBLICATIONS

European Patent Office, International Preliminary Report on Patentability, May 27, 2014, from International Patent Application No. PCT/EP2012/073119, filed on Nov. 20, 2012.

English Translation of European Patent Office, International Preliminary Report on Patentability, May 27, 2014, from International Patent Application No. PCT/EP2012/073119, filed on Nov. 20, 2012.

CN Office Action issued in CN Appln. No. 201280062784.X, dated Apr. 28, 2015, 10 paged (with EN translation).

* cited by examiner

ADJUSTABLE HOLDING DEVICE FOR SENSORS

FIELD OF THE INVENTION

The present invention relates to an adjustable holding device for sensors, comprising a main body, on and opposite which a bearing body supporting the at least one sensor is adjustably held by at least one spherical joint. A precise position of one or more sensors is intended to be able to be set about a plurality of degrees of freedom relative to the main body with the aid of such an adjustable holding device.

BACKGROUND INFORMATION

An adjustable holding device for motor vehicle headlamps is discussed, for example, in German patent document DE-A-29 16 225. A motor vehicle headlamp is held there in a frame which is mounted, inter alia, by a ball and socket joint, on a base plate. The ball and socket joint comprises a threaded stud with a ball socket on the end side, in which a ball connected to the frame is accommodated. The ball is pressed here into the ball socket by elastic deformation thereof. The threaded stud is screwed into the main body such that the frame supporting the headlamp is pivotable about the ball and socket joint. In order to set a certain pivoted position of the frame supporting the headlamp in relation to a vertical and a horizontal pivot axis intersecting the ball and socket joint, two adjusting screws are provided. The frame is therefore held in relation to the main body via the ball and socket joint and the two adjusting screws and therefore by three receptacles. The set position of the headlamps is merely secured here by the friction of the adjusting screws in the associated internal threads on the main body. Furthermore, the deformation of the elastic joint socket causes a certain flexibility of the ball and socket joint, which is detrimental to precise setting or long-term maintaining of the sensor position.

SUMMARY OF THE INVENTION

In contrast, the present invention is based on the object of providing an adjustable holding device for sensors, in which the position of the sensor can be set as precisely as possible and the position once set can be maintained in a stable manner for a long period.

This object may be achieved according to the present invention by the features described herein.

The present invention involves the aspect that the spherical joint comprises a threaded stud which is fastened to the main body and protrudes through a through-opening in the bearing body and to which an opening in a body having a spherical outer surface is screwed, said outer surface being held pivotably in complementarily spherical inner surfaces of two combined half shells, on the one hand, and, on the other hand, being held co-rotatably together with the half shells about an axis of rotation which is coaxial with the threaded stud and about which the half shells are accommodated rotatably in the through-opening in the bearing body in such a manner that, by a rotation under external force of the at least rotationally coupled half shells in relation to the through-opening, the body having the spherical outer surface can be screwed relative to the threaded stud by displacing the half shells and the bearing body in the direction of the threaded stud.

The body having a spherical outer surface can comprise a full ball, a partial ball or a spherical segment. It is essential for the spherical outer surface to be held in the complementarily spherical inner surface formed between the two half shells in order firstly to permit any rotations of the inner surface in relation to the outer surface.

Elastic deformations of the socket during the production of the spherical joint can be avoided because of the two combined half shells forming a socket for the spherical outer surface. This enables the spherical joint to have greater rigidity, which has a favorable effect on the setting accuracy of the sensor. Also, the diameter of the spherical surface can turn out to be relatively large in relation to the prior art, as a result of which the bearing surface or guide surface of the spherical joint is also correspondingly large, which likewise has a positive effect on the transmission force, the rigidity of the spherical joint therefore the setting accuracy.

The measures listed in the dependent claims permit advantageous developments and improvements of the invention indicated herein.

A dividing plane of the two half shells may be arranged in the through-opening. This can be realized, for example, by the half shells having tongues which are arranged distributed at a circumferential distance on the circumference and are elastically latchable in the through-opening. For example, a tongue of the one half shell projects here into an intermediate space formed between two tongues of the other half shell. In order to save costs, the half shells may be configured as identical parts.

In order to enable co-rotation of the body having the spherical outer surface, in particular the ball of the spherical joint, with the two half shells, pin-shaped drivers may protrude away from the spherical outer surface, said drivers engaging in grooves formed in the spherical inner surface. When the body having the spherical outer surface is screwed onto the threaded stud, said pin-shaped drivers are arranged in a plane perpendicular to the threaded stud and may be in a dividing plane of the half shells. As a result, in a similar manner as in the case of a cardan joint, first of all tilting of the bearing body in relation to the threaded stud is possible in all three rotational degrees of freedom. Secondly, however, nevertheless transmission of the rotational movement of the two coupled half shells to the body having the spherical outer surface is made possible, in order to screw down said body in relation to the threaded stud.

According to an embodiment which particularly may be used, the holding device has at least two such spherical joints, in particular three such spherical joints. The supporting body can then be adjusted in relation to the main body in all three rotational and translational degrees of freedom.

Particularly, a latching arrangement is provided between a flange-like surface of at least one of the half shells and a bore edge of the through-opening in the bearing body, for the releasable latching of rotational positions of the half shells in relation to the bearing body. Said latching arrangement can have projections which are provided on the circumference of the flange-like surface of the relevant half shell and are configured so as to be latchable into and unlatchable from corresponding recesses on the bore edge of the through-opening. In particular if the pitch ratio of the thread, via which the body having the spherical outer surface is connected to the threaded stud so as to be able to be screwed down, is known, the adjustment distance in the direction of the threaded stud can be determined depending on the angle of rotation of the half shells or depending on the latching positions distributed on the circumference. Furthermore, as a result, a rotational position of the half shells in relation to the threaded stud once it has been set, and therefore the position of the sensor, can be permanently maintained.

According to a development, the bearing body and the main body are in each case of plate-like configuration.

According to an embodiment which particularly may be used, the adjustable holding device holds at least one radar sensor which is contained by an adaptive cruise control (ACC).

The invention also relates to a vehicle comprising at least one adjustable holding device as claimed in one of the preceding claims.

Further measures improving the invention are illustrated in more detail below together with the description of an exemplary embodiment of the invention with reference to the drawing.

DETAILED DESCRIPTION

Figure 1:
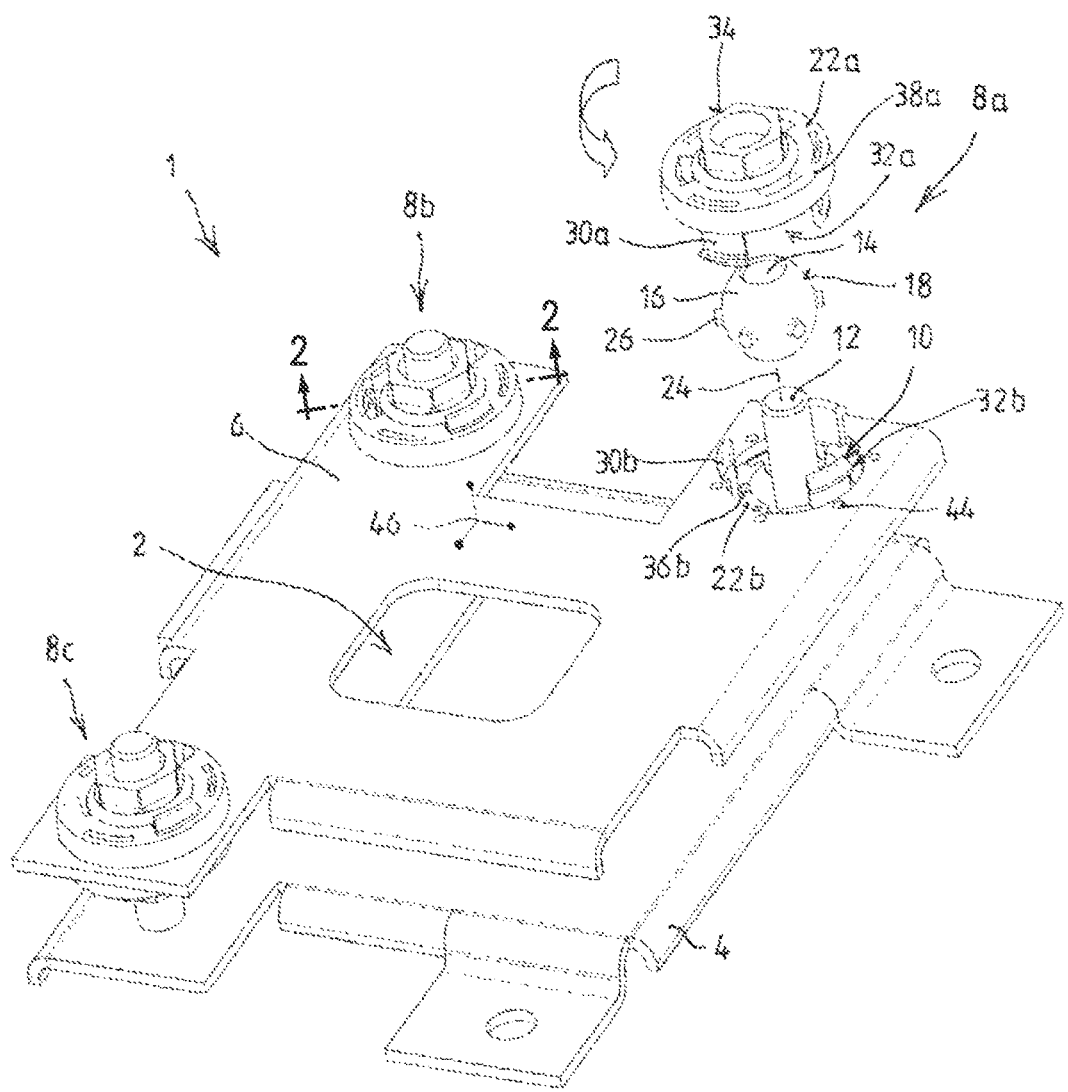
FIG. 1 shows a perspective exploded illustration of an adjustable holding device for sensors with spherical joints according to a specific embodiment of the invention with spherical joints.

FIG. 1 shows an exemplary embodiment of an adjustable holding device 1 for sensors, which comprises a base plate, on and opposite which a bearing plate 6 supporting, for example, a radar sensor 2 is adjustably held by what may be three spherical joints 8a, 8b, 8c. For the radar sensor 2, FIG. 1 merely shows an opening for the installation thereof, wherein said radar sensor is contained, for example, by an adaptive cruise control (ACC) of a vehicle, which keeps the distance from a vehicle traveling in front constant depending on the speed. For satisfactory operation, the radar sensor 2, which is held on the bearing plate 6, has to be precisely positioned, in a manner to be maintained permanently in relation to the base plate 4, in order to set a certain beam angle or a certain angular position of the radar sensor 2 with respect to the base plate 4. The adjustable holding device 1 described more precisely below is used for this purpose. The base plate 4 is fastened, for example, to a frame of the vehicle.

Figure 2:
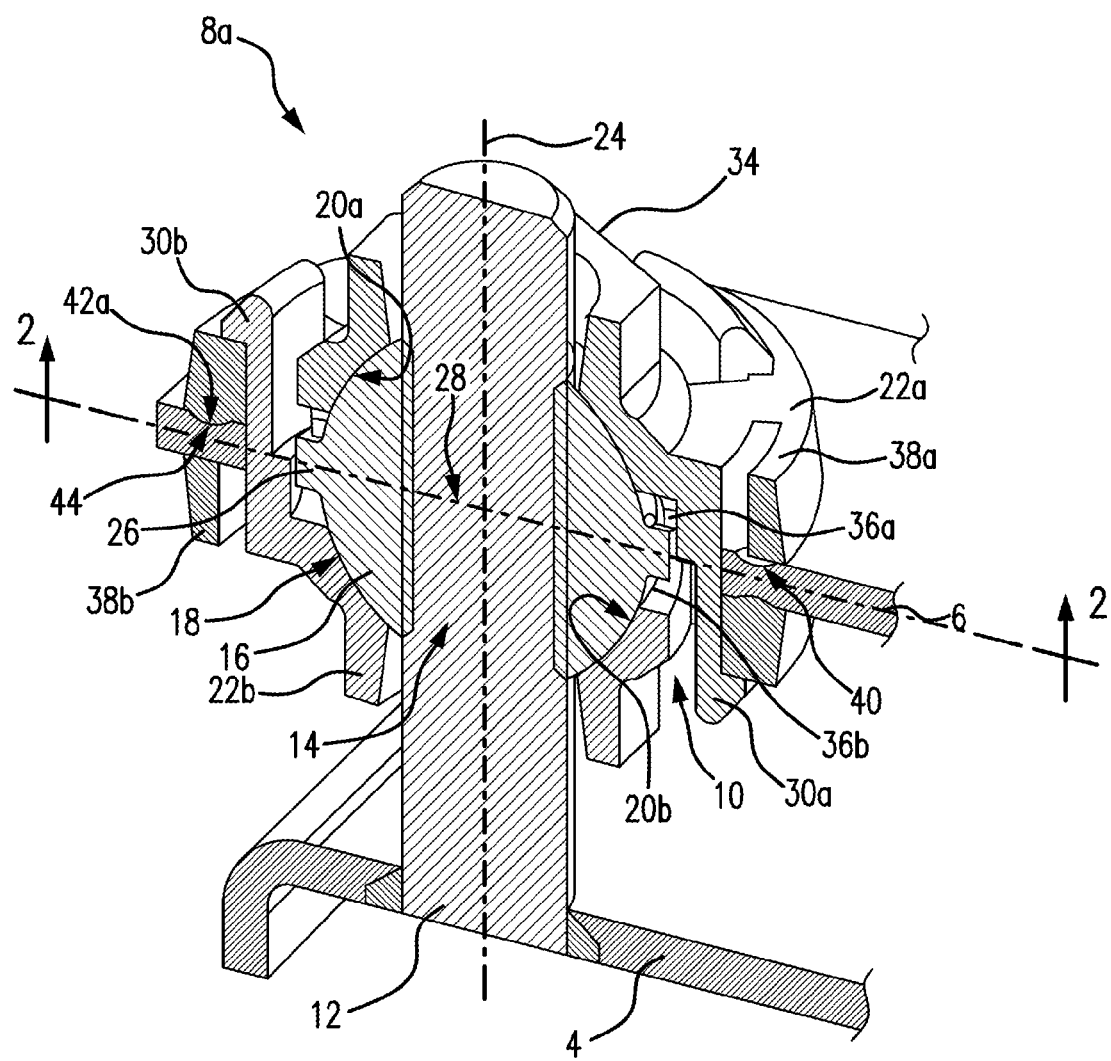
FIG. 2 shows a sectional illustration of a spherical joint from FIG. 1.

As representative of the two further spherical joints 8b, 8c, the upper, right spherical joint 8a is illustrated in an exploded manner in FIG. 1 and in section in FIG. 2. The spherical joint 8a comprises a threaded stud 12 which is fastened to the base plate 4 and protrudes through a through-opening 10 in the bearing plate 6 and to which an opening 14 in a body 16 having a spherical outer surface 18 is screwed. The body 16 having the spherical outer surface 18 may be a ball here, wherein the spherical outer surface 18 thereof is firstly held pivotably, with little play, in complementarily spherical inner surfaces 20a, 20b of two combined half shells 22a, 22b and is secondly held co-rotatably together with the half shells 22a, 22b about an axis of rotation 24 coaxial with the threaded stud 12. The at least rotationally coupled half shells 22a, 22b are accommodated rotatably about said axis of rotation 12 in the through-opening 10 in the bearing plate 6. The through-opening 10 in the bearing plate 6 has a larger diameter than the outside diameter of the threaded stud 12 so that the ball 16 with the equatorial diameter thereof or with driver pins 26 which are still to be explained can be arranged in the plane of the through-opening 10 in the bearing plate 6.

A dividing plane 28 of the two half shells 22a, 22b may be arranged in the plane of the through-opening 10 in the bearing plate 6, as FIG. 2 in particular shows. This can be realized, for example, by the half shells 22a, 22b having latching tongues 30a, 30b which are arranged distributed at a circumferential distance on the circumference and are elastically latchable in the through-opening 10. For example, a latching tongue 30a of the one half shell 22a protrudes here into an intermediate space 32b formed between two latching tongues 30b of the other half shell 22b. For this purpose, the half shells 22a, 22b may be configured as identical parts. In other words, the two half shells 22a, 22b are firstly rotationally coupled to each other via the latching tongues 30a, 30b and are secondly held in the through-opening 10 in the bearing plate 6, since the ends of the latching tongues 30a, 30b each engage over a bore edge of the through-opening 10, as can easily be imagined with reference to FIG. 2. Furthermore, the half shells 22a, 22b each have a gripping surface 34 for a tool, for example for a wrench, in order to be able to rotate said half shells as a unit in relation to the threaded stud 12.

In order to permit co-rotation of the ball 16 of the spherical joint 8a with the two half shells 22a, 22b, driver pins 26 may protrude from the spherical outer surface 18 of the ball 16 and engage in grooves 36a, 36b formed in the spherical inner surfaces 20 of the two half shells 22a, 22b. Said grooves 36a, 36b can best be seen with reference to FIG. 2 and each extend, for example, in the manner of degrees of longitude, for a distance beyond the dividing plane 28 of the two half shells 22a, 22b. When the ball 16 is screwed onto the threaded stud 12, the driver pins 26 are arranged in a plane perpendicular to the threaded stud 12 and in the dividing plane 28 of the half shells 22a, 22b which dividing plane is co-planar with the equatorial plane of the ball 16. This enables a rotational movement applied under external force to the two coupled half shells 22a, 22b to be transmitted to the ball 16 in order to screw down the latter in relation to the threaded stud 12. Secondly, as in the case of a cardan joint, tilting of the coupled half shells 22a, 22b and therefore the bearing plate 6 in relation to the threaded stud 12 in all three rotational degrees of freedom is possible.

Figure 3:
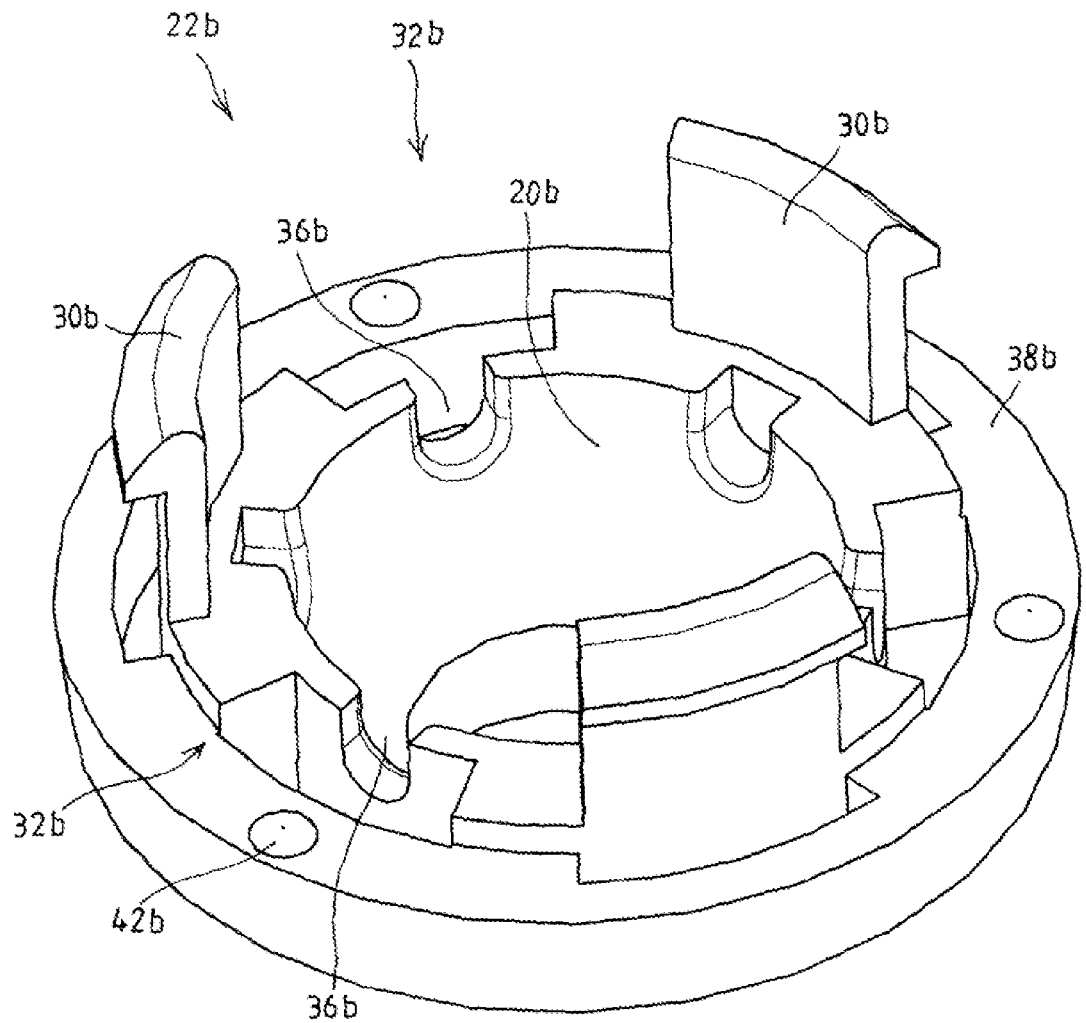
FIG. 3 shows the lower half shell of the spherical joint from FIG. 2 according to an exemplary embodiment.

Latching arrangement 40 particularly may be provided between flange surfaces 38a, 38b of the half shells 22a, 22b and the outwardly facing bore edges of the through-opening 10 in the bearing plate 6, for the releasable latching rotational positions of the half shells 22a, 22b in relation to the bearing plate 6. Said latching arrangement 40 has projections 42a, 42b which are provided on the circumference of the flange surfaces 38a, 38b of the half shells 22a, 22b and can best be seen in FIG. 3 which shows the lower half shell 22b in FIG. 1. The projections 42a, 42b are configured so as to be latchable into and unlatchable from corresponding recesses 44 on the bore edges of the through-opening 10. At least the balls 16 and the half shells 22a, 22b of the spherical joints 8a, 8b and 8c may be manufactured from a suitable plastic and may be injection molded.

Such a spherical joint 8a is then assembled as follows: first of all, a half shell 22b is inserted from below in FIG. 1 into the through-opening 10 in the bearing plate 6 until the elastic latching tongues 30b of said half shell engage over the upper bore edge, in FIG. 1, of the through-opening 10. The bearing plate 6 is then placed from above onto the base plate 4 in such a manner that the associated threaded stud 12 can protrude approximately centrally through the through-opening 10 in the bearing plate 6 and upward out of the through-opening 10.

In the next step, the ball 16 is then screwed onto the threaded stud 12, and the half shell 22b which is already held in the through-opening is rotated in such a manner that the driver pins 26 on the spherical outer surface 18 of the ball 16 can engage in the associated grooves 36b on the spherical half-ball inner surface 20b. The other half shell 22a is then inserted by the latching tongues 30a thereof into the through-opening 10 in such a manner that, firstly, the driver pins 26 of the ball 26 can engage again in the associated grooves 36a on the spherical half-ball inner surface 20a of the half shell 22a and, secondly, the latching tongues 30a can engage over the lower bore edge, in FIG. 1, of the through-opening 10 and at the same time can engage in the intermediate spaces 32b between the latching tongues 30b of the other half shell 22b in order to realize the rotational coupling of the two half shells 22a, 22b. The latching tongues 30b of the half shell 22b then also engage in the intermediate spaces 32a between the latching tongues 30a of the other half shell 22a. The grooves 36a, 36b of the spherical inner surfaces 20a, 20b of the half shells 22a, 22b are arranged here in such a manner that they are aligned with one another in the fitted state of the half shells 22a, 22b and merge without a gap and continuously into each other.

Against this background, the operation of the adjustable holding device 1 according to the invention is as follows: when the half shells 22a, 22b which are rotationally coupled to each other via the latching tongues 30a, 30b are rotated in relation to the through-opening 10 by gripping of a screwing tool on the gripping surface 34 of the upper half shell 22a in FIG. 1, as indicated by the arrow in FIG. 1, the ball 16 is co-rotated on the threaded stud 12 via the intermeshing driver pins/grooves 26, 36a, 36b, as result of which the position of the bearing plate 6 in the region of the threaded stud 12 changes relative to the threaded stud 12 and therefore to the base plate 4, by a vertical position in FIG. 1.

It is then easily possible to imagine with reference to FIG. 1 that the bearing plate 6 can be tilted with respect to the base plate 4 by adjustment of the further two spherical joints 8b, 8c in relation to the three spatial rotational degrees of freedom about a center pivot point 46 in order to produce a certain beam angle or a certain angular position of the radar sensor 2 relative to the base plate 4. The coupled half shells 22a, 22b can then rotate unobstructed in relation to the respective ball 16 in each of the three spherical joints 8a, 8b and 8c.

The list of reference numbers is as follows:
1 Holding device
2 Sensor
4 Base plate
6 Bearing plate
8a/b/c Spherical joints
10 Through-opening
12 Threaded stud
14 Opening
16 Ball
18 Spherical outer surfaces
20a/b Spherical inner surfaces
22a/b Half shells
24 Axis of rotation
26 Driver pins
28 Dividing plane
30a/b Latching tongues
32a/b Intermediate spaces
34 Gripping surface
36a/b Grooves
38a/b Flange surfaces
40 Latching arrangement
42a/b Projections
44 Recesses
46 Center pivot point

The invention claimed is:

1. An adjustable holding device for at least one sensor, comprising:
a main body, on and opposite which a bearing body supporting the at least one sensor is adjustably held by at least one spherical joint;
wherein the spherical joint includes a threaded stud which is fastened to the main body and protrudes through a through-opening in the bearing body and to which an opening in a body having a spherical outer surface is screwed, the outer surface being held pivotably in complementarily spherical inner surfaces of two combined half shells and held co-rotatably together with the half shells about an axis of rotation which is coaxial with the threaded stud and about which the half shells are accommodated rotatably in the through-opening in the bearing body so that by rotation under external force of the at least rotationally coupled half shells in relation to the through-opening, the body having the spherical outer surface is screwable relative to the threaded stud by displacing the half shells and the bearing body in the direction of the threaded stud,
wherein the main body includes a base plate, the sensor being held on the bearing body, the at least one spherical joint including at least three spherical joints, and
wherein the bearing body is tiltable with respect to the base plate by adjusting two of the spherical joints in relation to three spatial rotational degrees of freedom about a center pivot point to produce a certain angular position of the sensor relative to the base plate.

2. The adjustable holding device of claim 1, wherein the coupled half shells are rotatable in an unobstructed manner in relation to the respective ball in each of the three spherical joints.

3. The adjustable holding device of claim 1, further comprising:
a latching arrangement between a flange-like surface of at least one of the half shells and a bore edge of the through-opening in the bearing body, for latching rotational positions of the half shells in relation to the bearing body.

4. The adjustable holding device of claim 3, wherein the latching arrangement has projections which are provided on the circumference of the flange-like surface of the half shells and are configured so as to be latchable into and unlatchable from corresponding recesses on the bore edge of the through-opening.

5. The adjustable holding device of claim 1, wherein the bearing body and the main body are each of plate-like configuration.

6. The adjustable holding device of claim 1, wherein the body having the spherical outer surface includes a ball, a partial ball or a spherical segment.

7. The adjustable holding device of claim 1, wherein a dividing plane of the two half shells is arranged in the through-opening.

8. The adjustable holding device of claim 7, wherein the half shells have tongues which are arranged distributed on the circumference and are elastically latchable to the edge of the through-opening.

9. The adjustable holding device of claim 7, wherein drivers protrude away from the spherical outer surface of the body and engage in grooves formed in the spherical inner surfaces of the half shells.

10. The adjustable holding device of claim 9, wherein, when the body having the spherical outer surface is screwed onto the threaded stud, the drivers are arranged in a plane perpendicular to the threaded stud and in the dividing plane of the half shells.

11. The adjustable holding device of claim 1, wherein the half shells are identical parts.

12. A vehicle, comprising:
at least one adjustable holding device for at least one sensor, including:
a main body, on and opposite which a bearing body supporting the at least one sensor is adjustably held by at least one spherical joint;
wherein the spherical joint includes a threaded stud which is fastened to the main body and protrudes through a through-opening in the bearing body and to which an opening in a body having a spherical outer surface is screwed, the outer surface being held pivotably in complementarily spherical inner surfaces of two combined half shells and held co-rotatably together with the half shells about an axis of rotation which is coaxial with the threaded stud and about which the half shells are accommodated rotatably in the through-opening in the bearing body so that by rotation under external force of the at least rotationally coupled half shells in relation to the through-opening, the body having the spherical outer surface is screwable relative to the threaded stud by displacing the half shells and the bearing body in the direction of the threaded stud,
wherein the main body includes a base plate, the sensor being held on the bearing body, the at least one spherical joint including at least three spherical joints, and
wherein the bearing body is tiltable with respect to the base plate by adjusting two of the spherical joints in relation to three spatial rotational degrees of freedom about a center pivot point to produce a certain angular position of the sensor relative to the base plate.

13. The vehicle of claim 12, wherein the coupled half shells are rotatable in an unobstructed manner in relation to the respective ball in each of the three spherical joints.

14. The vehicle of claim 12, further comprising:
a latching arrangement between a flange-like surface of at least one of the half shells and a bore edge of the through-opening in the bearing body, for latching rotational positions of the half shells in relation to the bearing body.

15. The vehicle of claim 14, wherein the latching arrangement has projections which are provided on the circumference of the flange-like surface of the half shells and are configured so as to be latchable into and unlatchable from corresponding recesses on the bore edge of the through-opening.

16. The vehicle of claim 12, wherein the bearing body and the main body are each of plate-like configuration.

17. The vehicle of claim 12, wherein the body having the spherical outer surface includes a ball, a partial ball or a spherical segment.

18. The vehicle of claim 12, wherein a dividing plane of the two half shells is arranged in the through-opening.

19. The vehicle of claim 18, wherein the half shells have tongues which are arranged distributed on the circumference and are elastically latchable to the edge of the through-opening.

20. The vehicle of claim 18, wherein drivers protrude away from the spherical outer surface of the body and engage in grooves formed in the spherical inner surfaces of the half shells.

21. The vehicle of claim 20, wherein, when the body having the spherical outer surface is screwed onto the threaded stud, the drivers are arranged in a plane perpendicular to the threaded stud and in the dividing plane of the half shells.

22. The vehicle of claim 12, wherein the half shells are identical parts.

* * * * *